(12) United States Patent  (10) Patent No.: US 9,026,465 B2
Newton et al.  (45) Date of Patent: May 5, 2015

(54) SYSTEM TO EFFECTUATE POINT OF USE CONTROL AND ACCOUNTABILITY OF MONITORED ARTICLES

(75) Inventors: Jason M. Newton, Owasso, OK (US); David W. Hopkins, Tulsa, OK (US)

(73) Assignee: American Airlines, Inc., DFW Airport, TX (US)

( * ) Notice: Subject to any disclaimer, the term of this patent is extended or adjusted under 35 U.S.C. 154(b) by 1962 days.

(21) Appl. No.: 12/122,043

(22) Filed: May 16, 2008

(65) Prior Publication Data

US 2009/0033496 A1  Feb. 5, 2009

Related U.S. Application Data

(62) Division of application No. 11/269,226, filed on Nov. 8, 2005.

(51) Int. Cl.
*G06Q 10/00* (2012.01)
*G06K 17/00* (2006.01)
*G06Q 10/08* (2012.01)
*G06Q 20/20* (2012.01)

(52) U.S. Cl.
CPC ........ *G06K 17/00* (2013.01); *G06K 2017/0051* (2013.01); *G06Q 10/087* (2013.01); *G06Q 20/203* (2013.01)

(58) Field of Classification Search
None
See application file for complete search history.

(56) References Cited

U.S. PATENT DOCUMENTS

| | | | |
|---|---|---|---|
| 6,714,121 B1 | 3/2004 | Moore | 340/10.3 |
| 6,829,520 B1 | 12/2004 | Green | 700/225 |
| 7,337,963 B2 | 3/2008 | Harper et al. | 235/385 |
| 2006/0022827 A1 | 2/2006 | Higham | 340/572.1 |
| 2006/0102718 A1 | 5/2006 | Kajino et al. | 235/385 |
| 2006/0290471 A1 | 12/2006 | Van Alstyne | 340/10.1 |
| 2007/0108273 A1 | 5/2007 | Harper et al. | 235/382 |
| 2007/0150382 A1 | 6/2007 | Danilewitz | 705/28 |
| 2007/0285242 A1 | 12/2007 | Higham | 340/572.1 |
| 2008/0122615 A1* | 5/2008 | Shoenfeld | 340/540 |
| 2008/0135613 A1* | 6/2008 | Dearing et al. | 235/385 |
| 2009/0021345 A1* | 1/2009 | Sriharto et al. | 340/5.6 |
| 2010/0141457 A1* | 6/2010 | Wass et al. | 340/572.8 |

FOREIGN PATENT DOCUMENTS

WO  WO 2007064816 A2  6/2007 ............. G06Q 10/00

OTHER PUBLICATIONS

"Catheter Cabinet & Stent Cabinet: New Versions of Supply Cabinet are Here," May 20, 2003, http://www.mobileaspects.com/news/pressrelease/press_release_5.20.03.html.

(Continued)

*Primary Examiner* — F. Zeender
(74) *Attorney, Agent, or Firm* — Winstead, P.C.

(57) ABSTRACT

The method and system for a material cabinet for use in cooperation with a plurality of articles stored in the material cabinet is disclosed. Each of the plurality of articles having a radio frequency identification tag attached thereto is connected through at least an antenna or a plurality of antennas installed in the material cabinet to a radio frequency identification reader, which is interpreted through a software in a computer system. This method and system has capability to effectuate point of use control of the stored articles through a database in the computer system. This method and system also implements a security mechanism through a lock system to secure the store articles from unauthorized user/stock clerks.

13 Claims, 7 Drawing Sheets

(56) References Cited

OTHER PUBLICATIONS

9$^{th}$ Annual DoD Government/Industry Shelf-Life Symposium, Kansas City, Missouri, Oct. 30-31, 2002, Oak Ridge National Laboratory, pp. 1-24.
Office Action for U.S. Appl. No. 11/269,226 dated Jun. 25, 2008.
Office Action for U.S. Appl. No. 11/269,226 dated Nov. 18, 2008.
RFIDusa.com—One-Source for Radio Frequency Indenitification; RFID Shelf Antennas; http://www.rfidusa.com/superstore/product_info.php?products_id=223; pp. 1-7; by Bob Scher, CEO, Dynasys.
RDI ID Technologies; http://www.rsiidtech.com/solutions_smartmedicinecabinet.asp; 1 p.
RFIDa—Achive Breakthrough Performance Through RFID Radio Frequency Indentification Technology; http://www.rfida.com/rfidtech.htm; pp. 1-7.
RFIDusa.com—Once Source for Radio Frequency Indentification; Software and Middleware for RFID Applications; http://rfidusa.com/superstore/index.php?cPath=36; pp.1-3.
RFID in Retail Stores: Suggestions for Eliminating Smart Shelves; Retail RFID Systems without Smart Shelves http://www.jefflindsay.com/rfidl.shtml; by Jeff Lindsay, Walter Reade, and Larry Reade, and Larry Roth; Dec. 23, 2003 on IP.com as Article 21114D; http://priorart.ip.com/viewPub.jsp!pubID=IPCOM00002114D; pp. 1-13.

* cited by examiner

SYSTEM TO EFFECTUATE POINT OF USE CONTROL AND ACCOUNTABILITY OF MONITORED ARTICLES

CROSS REFERENCE

The present application is a divisional application of co-pending U.S. patent application Ser. No. 11/269,226, entitled "Method and System to Effectuate Point of Use Control and Accountability of Monitored Articles," filed Nov. 8, 2005, which is incorporated by reference herein. The present application claims priority benefits to U.S. patent application Ser. No. 11/269,226 under 35 U.S.C. §121.

STATEMENT OF FEDERALLY SPONSORED RESEARCH/DEVELOPMENT

This application is not federally sponsored research/development.

REFERENCES TO SEQUENCE LISTING

This application is not referenced to any microfiche appendix.

FIELD OF INVENTION

This invention relates to inventory tracking of material used and a security mechanism for granting access to authorized users.

BACKGROUND

In many industrial settings, an inventory system is set up for managing and tracking materials being used and stored. This is often used as a method to reduce unnecessary purchase and disposal of objects by making existing material stocks available. Historically, an inventory system is managed by clerks and therefore human errors occur frequently. Recently automatic controlled inventory systems have been implemented to replace the traditional human controlled system. For example, a bar code system can be implemented to track assets, consumables, non-consumables, documents, manufacturing goods, chemicals, and warehouse inventories. However, a bar code system still requires human intervention for scanning bar coded objects when the object is checked-in or checked-out.

As a result, Radio Frequency Identification (RFID) systems have emerged as an affordable solution for object identification. They are a cheap and error proof alternative for traditional object identification techniques such as bar codes and visual recognition. Such wireless systems allow for non-contact reading and are effective in manufacturing and other hostile environments where bar code labels could not properly employed. RFID has been used in a wide range of applications such as asset tracking in supply chains, livestock identification, automated vehicle identification systems, security systems etc., because of its ability to track moving objects.

The present invention discloses a system and method of combining RFID technology and access control mechanism to effectively manage moveable materials within a contained cabinet or the like. This invention allows tracking of materials being checked in or checked out and alerts personnel when materials are depleted. This invention also ensures material is used only by authorized users. A computer-controlled mechanism is also implemented with the system that allows automatic tracking of the moveable objects and makes these objects available when needed to ensure their efficient use.

BRIEF SUMMARY OF THE INVENTION

A radio frequency identification (RFID) tag is affixed to each piece of a plurality of articles to allow monitoring the check-in and check-out process of any piece of the plurality of articles. It is an object of the present invention to provide point of use tracking and recording system for articles stored in an access controlled material cabinet.

It is another object of this invention to provide security of the stored plurality of articles by granting access to only authorized user/stock clerks by integrating the RFID technology, access control mechanism through a computer system.

Further objects of this invention will be brought out in the following part of the specifications, wherein detailed description is for the purpose of fully disclosing the invention without placing limitations thereon.

DETAILED DESCRIPTION OF THE INVENTION

The present invention will now be described with reference to the drawings wherein like reference numerals are used to refer to like elements throughout.

Figure 1:
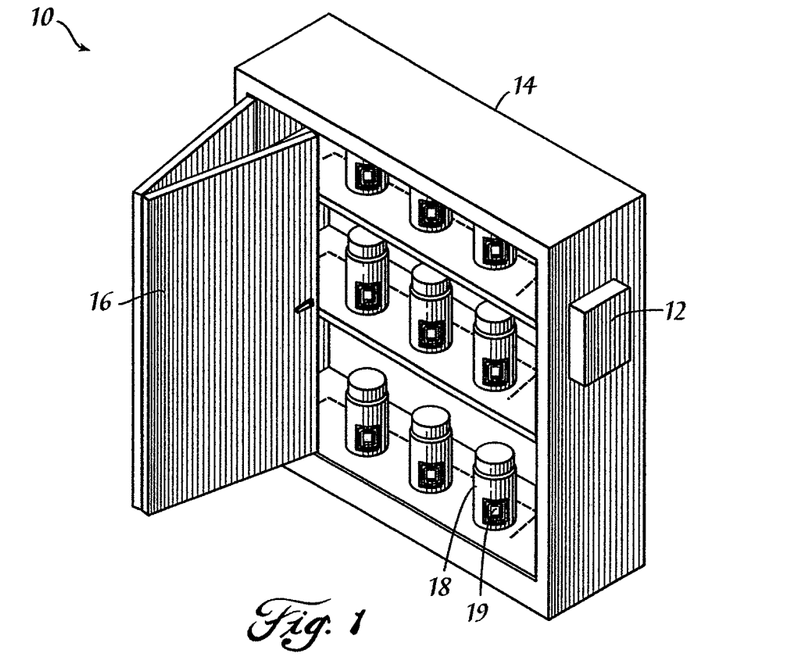
FIG. 1 depicts a perspective view of a material cabinet system having a magnetic reader and articles stored therein the cabinet having a radio frequency identification tag attached to it according to the present invention.

FIG. 1 depicts a perspective view of a material cabinet system having a magnetic reader lock with a plurality of articles 18 having a radio frequency identification tag attached thereto the articles 18. Referring now to FIG. 1, the material cabinet system 10 includes a conventional material cabinet 14 with a material cabinet door 16 to conceal and secure the material cabinet. A proximity reader 12 is installed to control the access to the material cabinet 14. At least one antenna or one antenna system with a plurality of antennas, (not shown in FIG. 1), can be installed inside or outside the material cabinet 14. The antennas may be of any of the common types well known in the art. Depending upon the size of the material cabinet 14, one or more antennas are deployed in such a way as to provide complete and adequate communication transmission coverage to the material cabinet 14. A plurality of articles 18 can be stored inside the material cabinet 14 each having an RFID tag 19 affixed on each article 18.

Figure 2:
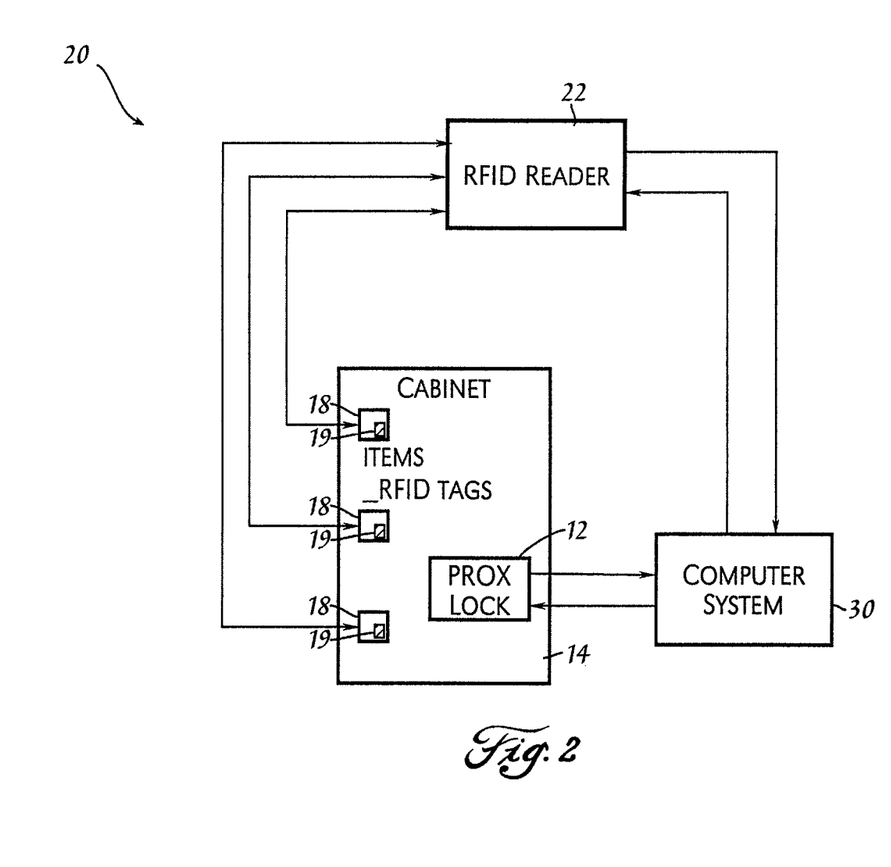
FIG. 2 depicts a schematic diagram of an embodiment of the material cabinet system according to the present invention.

FIG. 2 depicts a schematic diagram 20 of an embodiment of the material cabinet system according to the present invention. According to FIG. 2, the material cabinet system is operationally and communicably connected to a computer system 30. Specifically, a plurality of articles 18 carrying RFID tags 19 are in communication with an RFID reader 22, which is in communication with the computer system 30. The proximity reader 12 is operationally and communicably connected with the computer system 30.

The computer system 30 maintains inventory communication with the plurality of articles 18 by employing the RFID tags 19 on each of the articles 18 wherein each article 18 is in communication with the antennas installed inside or outside of the material cabinet 14. The antennas operate to send and receive signals that interact with the RFID tags 19 when an article 18 affixing the RFID tag 19 is removed from or put into the material cabinet 14. In a preferred embodiment of the invention, a passive RFID system is used.

The computer system 30 of the present invention includes an application server, a web service layer, and a database containing an article tracking system (each not individually shown in FIG. 2.) In one embodiment of the present invention, the application server can be a Windows 2000 server wherein a proximity software and a communications software control and maintain inventory and access functionality to the material cabinet 14. The application server is also communicably connected to two Network Interface Cards (NIC), one for communicating with the material cabinet 14 and another for communicating with the web server layer. The web server layers provides a scalability and reusability functionality to the database for inventory tracking of the articles 19 in the material cabinet 14. The web server layer is communicably connected to the database containing the article tracking system. As one of ordinary skill in the art will understand, the computer system includes at least one computer hard drive, at least one monitor, and at least one printer.

In FIG. 2, each passive RFID tag 19 comprises unique data. As each article 18 having such an RFID tag 19 is removed from or put into the material cabinet 14, the antenna powers the passive RFID tag 19 and the unique data contained in the passive RFID tag 19 is emitted in a signal that is received by the antenna and transferred to the RFID reader 22 connected to the computer system 30. The transfer may be accomplished through a wired or wireless connection. The computer system 30 then compares the number of removed or inserted articles to an inventory database stored in the computer system 30 that maps unique data to each piece of the articles 18. The inventory database contains pertinent information for each article 18 having a passive RFID tag 19 assigned to it. Such information may include, but is not limited to, generic name, scientific name, date of acquisition, date of expiration, the vendor that the piece of article was purchased from, barcode number. However, one skilled in the art will understand that any type of information can be contained in the inventory database 35.

Figure 3A:
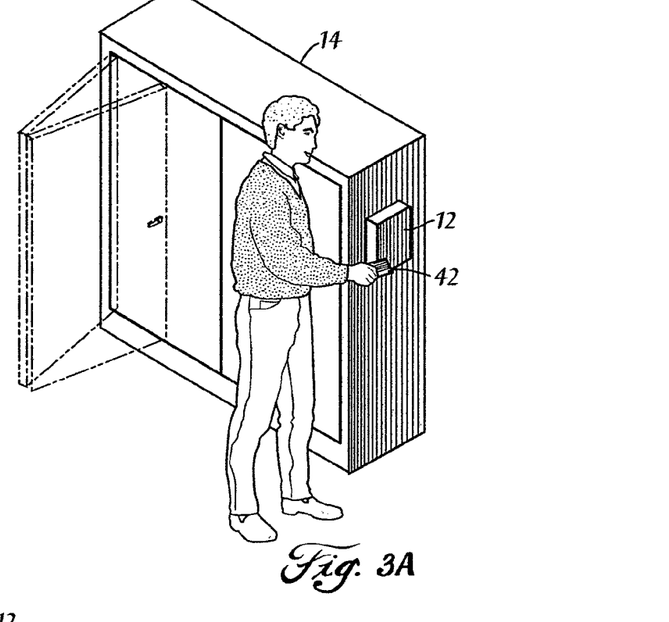
FIGS. 3A through 3C together depict a view of a user/stock clerk checking out an article from the material cabinet system according to the present invention.

The computer system 30 also employs a user/stock clerk identification process, which is implemented by connecting the computer system 30 to the proximity reader 12 installed on the material cabinet 14. One skilled in the art will recognize that a number of different identification processes may be implemented to control the access to the material cabinet 14. In the embodiment shown in FIG. 2, the proximity reader 12 is installed on the material cabinet 14 such that an authorized user/stock clerk requiring access to the material cabinet 14 must swipe the proximity badge 42 (shown in FIG. 3) across the proximity reader 12 to gain access. A software is installed in the computer system 30 and is employed to map user/stock clerk identification previously stored in the computer system 30.

As mentioned above, the computer system 30 employs an article scalability and reusability function wherein when an article 18 is removed, the computer system 30 will determine whether the article 18 is returnable to the material cabinet 14 or not.

In another embodiment, a built-in speaker and/or a flashing device (not shown in FIG. 2) are installed on the material cabinet 14. The speaker and the flashing device are connected to the computer system 30 and a software component is employed to allow the speaker to sound different phrases or sentences under certain circumstances. For example, when a user/stock clerk swipes an invalid proximity badge across the proximity reader, the computer system will transmit a signal to cause the speaker sound, "unauthorized user/stock clerk" and/or the flashing device to flash.

Figure 3B:
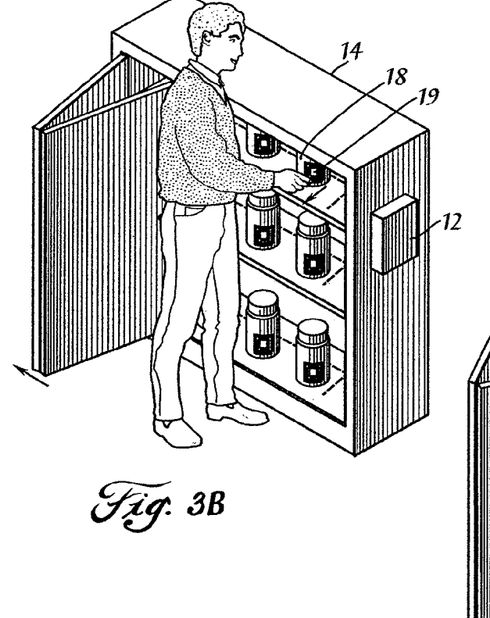
Figure 3C:
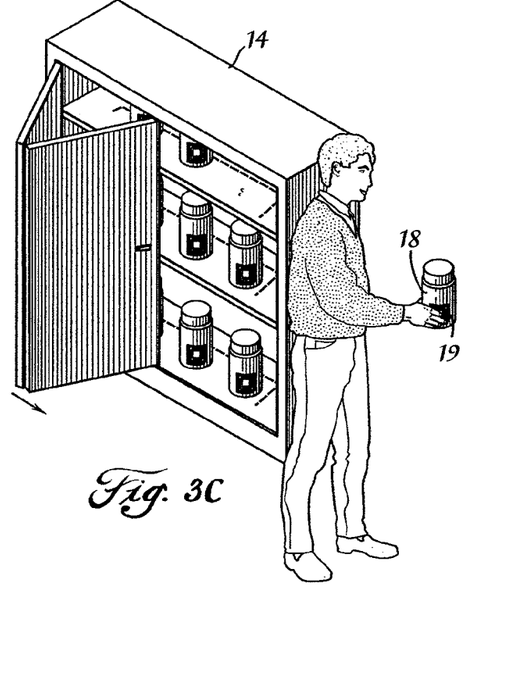

FIGS. 3A-3C together depict a view of a user/stock clerk checking out an article from the material cabinet according to the present invention. Referring now to FIGS. 3A-3C, the process of article 18 check-out 40 is shown. In FIG. 3A, a user/stock clerk swipes the proximity badge 42 across the proximity reader 12, the computer system 30 receives the signal and determines whether access is granted or not. When access is granted, as shown in FIG. 3B, the material cabinet door 16 is opened and the speaker sounds predetermined phrases to the user/stock clerk. The user/stock clerk then removes one or more articles 18, shown in FIG. 3C, and simultaneously the antenna transmits unique data relating to the RFID tag 19 which is disposed on the article 18 being removed from the material cabinet 14. The RFID reader 22 (shown in FIG. 2) then interprets the unique data and the computer system 30 maps the unique data to the inventory database 35 (shown in FIG. 2) and records the transaction.

Figure 4A:
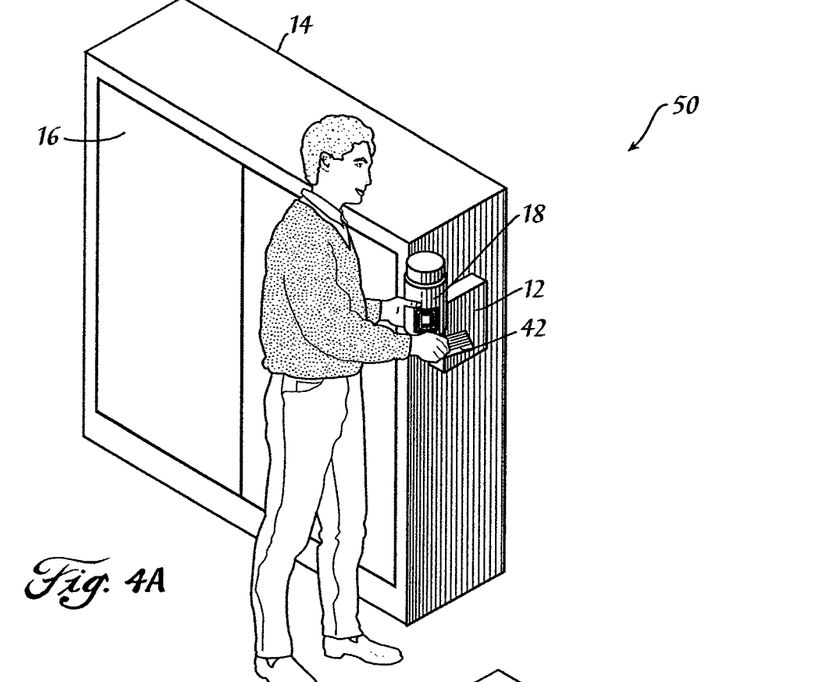
FIGS. 4A and 4B together depict a view of a user/stock clerk checking in an article to the material cabinet system according to the present invention.
Figure 4B:
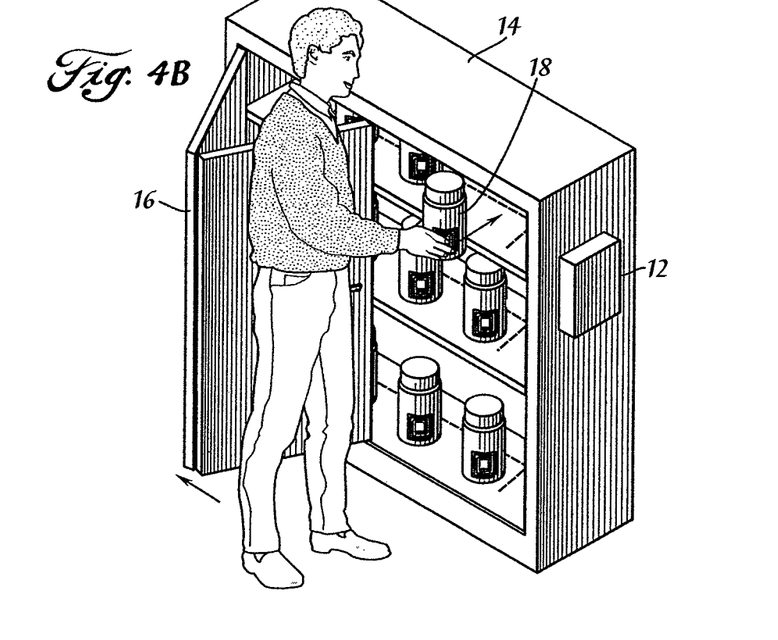

FIGS. 4A and 4B together show a process view of a user/stock clerk checking in an article 18 to the material cabinet 14. Referring now to FIGS. 4A and 4B, the process of article check-in 50 is shown. In FIG. 4A, a user/stock clerk swipes the proximity badge 42 across the proximity reader 12, the computer system 30 receives a signal and determines whether access is granted or not. When access is granted, as shown in FIG. 4B, the material cabinet door 16 is opened and the speaker sounds predetermined phrases to the user/stock clerk. The user/stock clerk then places one or more articles 18 into the material cabinet 14, the antenna then transmits unique data relating to the RFID tag 19, which is disposed on the article being inserted into the material cabinet 14. The RFID reader 22 (shown in FIG. 2) then interprets the unique data and the computer system 30 maps the unique date to the inventory database 35 (shown in FIG. 2) and records the transaction.

Figure 5A:
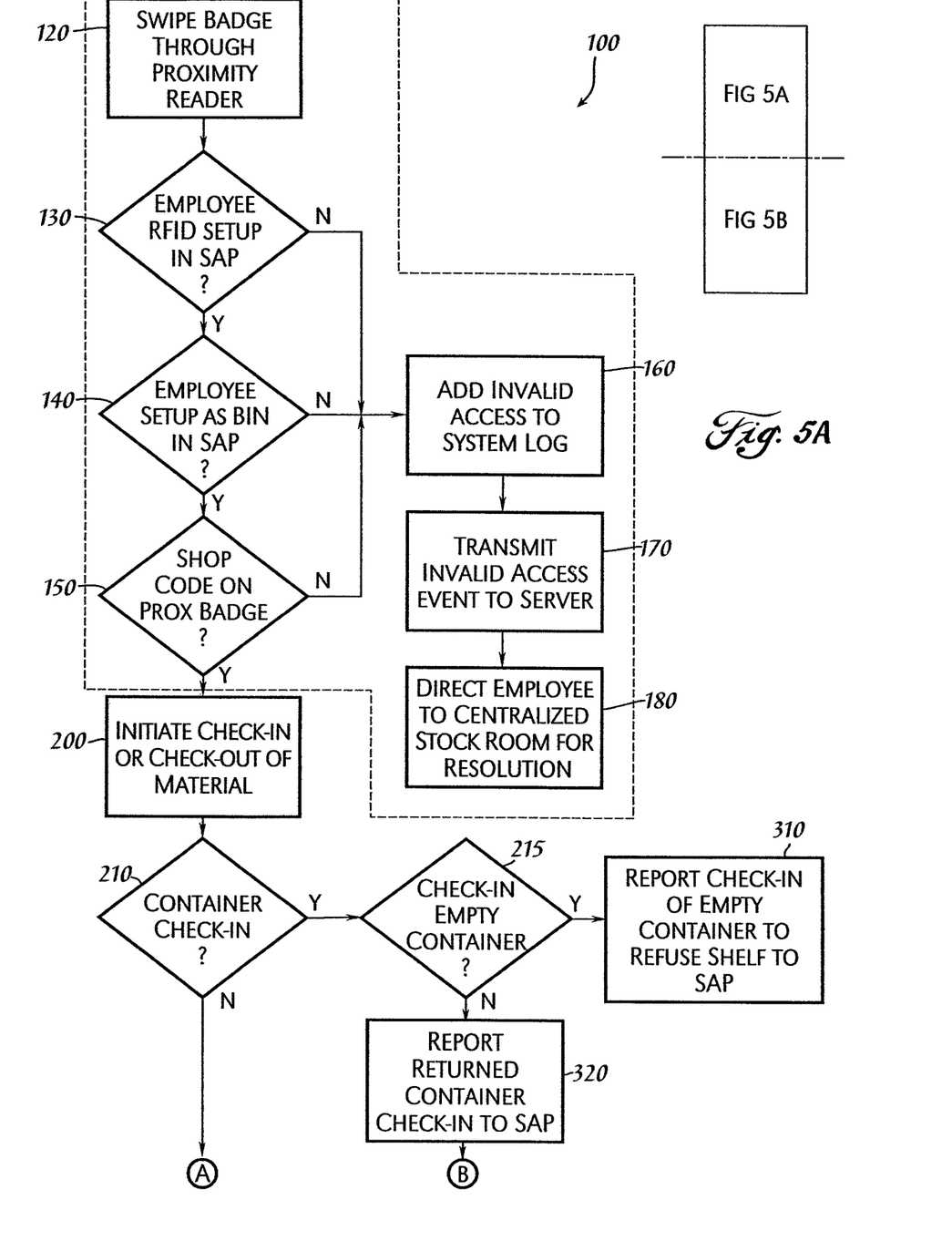
FIGS. 5A and 5B together depict a flow chart of the method of an embodiment for using the material cabinet of the present invention.
Figure 5B:
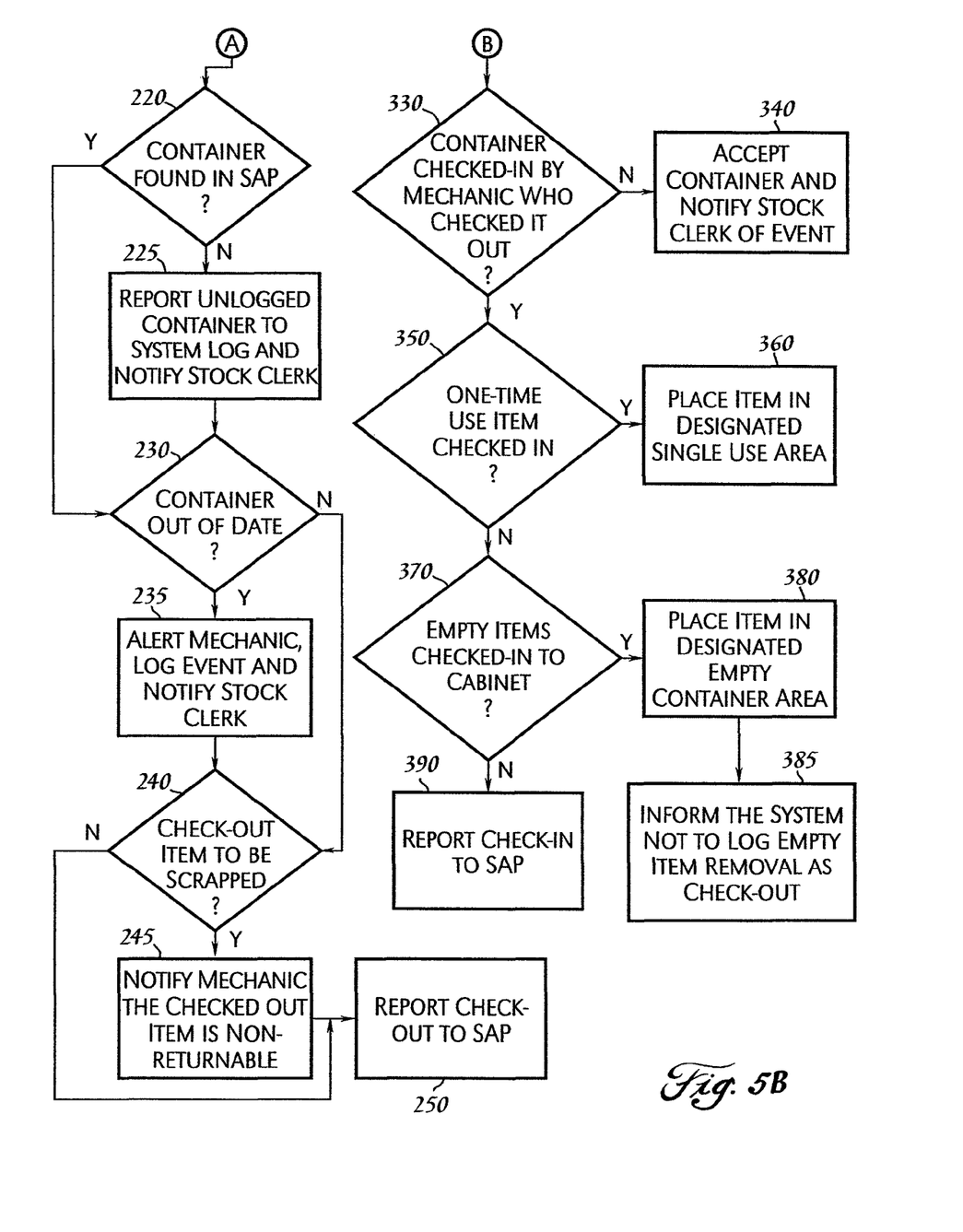

FIGS. 5A and 5B together depict a flow chart of the method of an embodiment for using the material cabinet of the present invention. Referring specifically to FIG. 5A, in step 120 the proximity badge 42 (shown in FIGS. 3A-3C and FIGS. 4A-4B) is swiped across or through the proximity reader 12 by a user/stock clerk. Step 130 then determines whether the user/stock clerk has an RFID setup in the computer system 30. If step 130 identifies that, the user/stock clerk has an RFID setup in the inventory system, then step 140 checks to see if the user/stock clerk setup as (BIN) in the inventory database 35 (shown in FIG. 2). As used herein, the term "BIN" is used to refer to a location within the cabinet, such as but not limited to a shelf, or number of shelves within the cabinet. If step 140 determines that the user/stock clerk is setup as BIN in the inventory database, then step 150 determines if the proximity badge 42 has that shop code on the proximity badge 42. If step 150 determines that the shop code is on the proximity badge 42, then step 200 of article check-out or check-in is initiated.

If a denial in any one of the steps 130, 140 and 150 occurs, then step 160 is initiated to add an invalid access system log to the inventory database, transmits the invalid access to the computer system, step 170, and then directs the user/stock clerk to centralized stock room for resolution through the speaker system, step 180.

In step 200, the various modules of the material cabinet system activate the various apparatus and hardware connecting to the computer system 30, including the RFID reader 22, the speaker, and cooperation of the proximity badge 42 and RFID reader 22. Following step 200, step 210 checks to see if the process is a container check-in. If step 210 determines that the process is an empty container check-in, then step 310 is initiated to report check-in of an empty container to the refuse shelf to the computer system 30. If step 210 determines that the process is not an empty container check-in, then step 320 reports that a returned container check-in has occurred to the computer system 30 and then goes to the determination step 330 (see FIG. 5B) to check if the container is being checked-in by the same user/stock clerk who checked it out (shown in FIG. 5B). If step 330 determines that the container checked in is not by the same user/stock clerk who checked it out, then step 340 accepts the container and notifies the stock clerk of the event through the computer system 30. If step 330 determines that, the container check-in is by the same user/stock clerk who checked it out, then step 350 checks to see if the container is a "one time use" article check-in. If step 350 determines that the container is one time use article check-in, then step 360 notifies the user/stock clerk to place the article in designated single use area in the material cabinet 14 through the computer system 30. If step 350 determines that, the container is not a one time use article check-in, then step 370 further checks to see if it is empty articles check-in to the material cabinet 14. If step 370 determines that it is an empty article check-in to the material cabinet 14, then step 380 notifies the user/stock clerk to place the article in a designated empty container area, then step 385 informs the computer system 30 not to log the empty article removal as check-out. If step 370 determines that it is not an empty article check-in to the material cabinet 14, then step 390 reports check-in to the inventory database 35 of the computer system 30.

Now referring back to step 210, wherein step 210 determines whether it is a container check-in. If step 210 determines it is not a container check-in, then step 220 shown in FIG. 5B further checks to see if the container is found in the material cabinet or not. If step 220 determines that, the container is not found in the material cabinet, then step 225 reports an unlogged container to the inventory database 35 and notifies the stock clerk followed by step 230. If step 220 determines that the container is found in the material cabinet, then step 230 is directly accomplished. Step 230 checks to see if the container is out of date or not. If step 230 determines that the container is out of date, then step 235 alerts a mechanic, logs the event in the inventory database, and notifies the stock clerk, then precedes to step 240. If step 230 determines that the container is not out of date, then step 240 is directly accomplished. Step 240 determines whether the check-out article is to be scrapped. If step 240 determines that the check-out article is to be scrapped, then step 245 notifies the user/stock clerk that the checked out article is non returnable, and then goes to step 250 to report check-out to the system. If step 240 determines that the check-out article is not to be scrapped, then step 250 is directly accomplished. Step 250 reports the check-out event to the inventory database 35 in the computer system 30.

Figure 6:
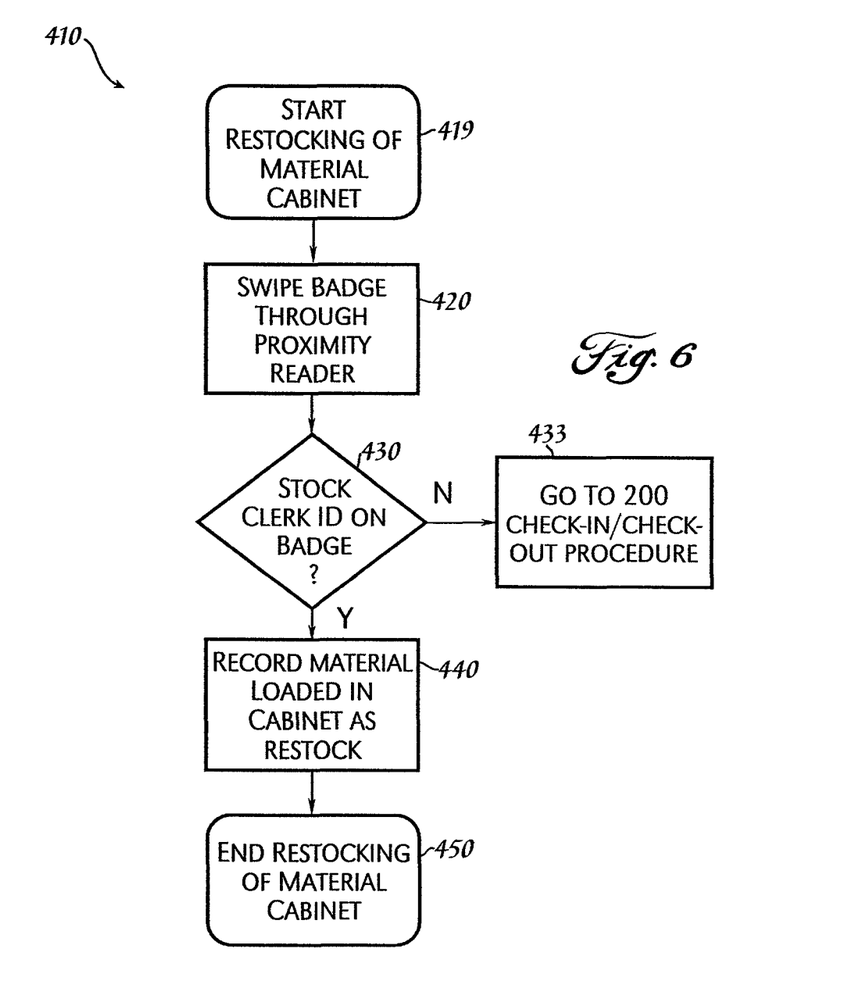
FIG. 6 depicts a flow chart of the method for restocking articles to the material cabinet according to the present invention.

FIG. 6 depicts a flow chart of the method for restocking 410 articles 18 to the material cabinet 14 according to the present invention. Now referring to FIG. 6, in step 419 the restocking process of the material cabinet is started followed by step 420 where a proximity badge 42 is swiped across the proximity reader 12 on the material cabinet 14. Step 430 then determines if the proximity badge 42 is a card authorized to a stock clerk such that the stock clerk's ID is on the proximity badge 42. If step 430 determines that the proximity badge 42 does not contain the clerk ID on the proximity badge 42, then at step 433 the method will accomplish user/stock clerk RFID setup 130 as shown in FIG. 5A. If step 430 determines that the stock clerk's ID is on the proximity badge 42, then step 440 records materials/articles that are loaded into the material cabinet 14 as restock. Step 450 depicts the end of the restocking process 400 according to the present invention.

Having described different embodiments of the present invention, it will be understood by those skilled in the art that many changes in construction and connections and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired.

It is therefore, contemplated that the claims will cover any such modifications or embodiments that fall within the true scope of the invention.

What is claimed is:

1. A material cabinet system for use in cooperation with a plurality of articles stored in a material cabinet, each of the plurality of articles having a radio frequency identification (RFID) tag attached thereto, the system comprising:
   a material cabinet having a plurality of shelves installed;
   a magnetic lock system incorporated within the cabinet;
   at least one antenna for tracking the movement of the plurality of pieces of articles, wherein the at least one antenna receives a radio frequency identification (RFID) signal for each of the plurality of articles having the attached radio frequency identification (RFID) tag when moved from or onto the plurality of shelves in the material cabinet; and
   a computer system in communication with the at least one antenna and the magnetic lock system, the computer system having at least one tracking software loaded into a memory of the computer system.

2. The material cabinet system according to claim 1, wherein the tracking software in the computer system further comprises:

a plurality of instructions, the instructions for controlling a proximity reading module for reading and identifying a swiped proximity badge and for maintaining inventory communication;

a radio frequency identification tracking module for interpreting a unique data from each of the radio frequency identification signals received by the at least one antenna and related to date and the proximity module wherein the software further controls an inventory database module for storing data on each of the plurality of pieces of articles, wherein each of the unique data corresponds to the data for one of the plurality of pieces of articles and for controlling a reporting module for generating at least one report regarding an event of check-in or check-out of the plurality of pieces of articles.

3. The material cabinet system according to claim 1, wherein the material cabinet comprises at least a door installed to secure the material cabinet.

4. A material cabinet system according to claim 1, wherein the magnetic lock system comprises:
 a proximity reader connecting to the computer system; and
 at least one proximity badge for providing functionality to the proximity reader to grant permission for opening the door of the material cabinet.

5. A material cabinet system according to claim 1, further comprising a speaker installed inside or outside of the material cabinet and connected to the computer system.

6. A system, comprising:
 a material cabinet with a door to conceal and secure said material cabinet;
 a proximity reader attached to said material cabinet, wherein said proximity reader is configured to control access to said material cabinet;
 one or more antennas configured to provide communication transmission coverage to said material cabinet; and
 a radio-frequency identification reader in communication with one or more radio frequency identification tags attached to one or more articles via said one or more antennas.

7. The system as recited in claim 6, wherein said one or more antennas are installed inside said material cabinet.

8. The system as recited in claim 6, wherein said one or more antennas are installed outside said material cabinet.

9. The system as recited in claim 6 further comprising:
 a computer system in communication with said proximity reader.

10. The system as recited in claim 9, wherein said computer system is in communication with said radio frequency identification reader.

11. The system as recited in claim 10, wherein said computer system tracks an inventory of said one or more articles stored inside said material cabinet based on said communication with said radio frequency identification reader.

12. The system as recited in claim 6 further comprising:
 a speaker installed on said material cabinet.

13. The system as recited in claim 6 further comprising:
 a flashing device installed on said material cabinet.

* * * * *